US012570842B2

(12) United States Patent
Tatematsu et al.

(10) Patent No.: US 12,570,842 B2
(45) Date of Patent: Mar. 10, 2026

---

(54) THERMOPLASTIC ELASTOMER COMPOSITION AND SHAPED ARTICLE THEREOF

(71) Applicant: MITSUI CHEMICALS, INC., Tokyo (JP)

(72) Inventors: Nana Tatematsu, Ichihara (JP); Hayato Kurita, Ichihara (JP)

(73) Assignee: Mitsui Chemicals, Inc., Tokyo (JP)

( * ) Notice: Subject to any disclaimer, the term of this patent is extended or adjusted under 35 U.S.C. 154(b) by 622 days.

(21) Appl. No.: 17/797,015

(22) PCT Filed: Mar. 30, 2021

(86) PCT No.: PCT/JP2021/013503
§ 371 (c)(1),
(2) Date: Aug. 2, 2022

(87) PCT Pub. No.: WO2021/200928
PCT Pub. Date: Oct. 7, 2021

(65) Prior Publication Data
US 2023/0071200 A1     Mar. 9, 2023

(30) Foreign Application Priority Data

Mar. 31, 2020     (JP) ................................. 2020-063800

(51) Int. Cl.
*C08L 23/0807*          (2025.01)

(52) U.S. Cl.
CPC ......... *C08L 23/083* (2013.01); *C08L 23/0815* (2013.01)

(58) Field of Classification Search
CPC .... C08L 2207/04; C08L 23/10; C08L 23/083; C08L 23/0815; C08K 3/013
See application file for complete search history.

(56) References Cited

U.S. PATENT DOCUMENTS

| | | | | | |
|---|---|---|---|---|---|
| 7,582,352 B2 * | 9/2009 | Kobayashi | .............. | B32B 27/32 |
| | | | | | 428/319.3 |
| 2008/0287588 A1 | 11/2008 | Van Hoyweghen | | | |

| | | | | | |
|---|---|---|---|---|---|
| 2011/0117358 A1 | 5/2011 | Kurita | | | |
| 2017/0253709 A1 | 9/2017 | Kurita et al. | | | |
| 2017/0349737 A1 | 12/2017 | Chiba et al. | | | |
| 2018/0072880 A1 * | 3/2018 | Kurita | ..................... | C08L 23/16 |
| 2018/0086904 A1 * | 3/2018 | Kurita | ..................... | C08L 23/10 |

FOREIGN PATENT DOCUMENTS

| | | | | | |
|---|---|---|---|---|---|
| CA | | 2123082 A1 | 5/1993 | | |
| JP | | H05-287132 A | 11/1993 | | |
| JP | | H09-157426 A | 6/1997 | | |
| JP | | H10-101853 A | 4/1998 | | |
| JP | | 2000-026640 A | 1/2000 | | |
| JP | | 2000-191863 A | 7/2000 | | |
| JP | | 2000-344969 A | 12/2000 | | |
| JP | | 2001-294672 A | 10/2001 | | |
| JP | | 2002-173562 A | 6/2002 | | |
| JP | | 2002-206034 A | 7/2002 | | |
| JP | | 2018178006 A | * 11/2018 | .............. | C08K 5/14 |
| JP | | 2021-109946 A | 8/2021 | | |
| WO | WO-2016/039310 A1 | | 3/2016 | | |
| WO | WO-2016/140252 A1 | | 9/2016 | | |

OTHER PUBLICATIONS

JP2018178006A English (Year: 2018).*

* cited by examiner

*Primary Examiner* — Catherine S Branch
*Assistant Examiner* — Huihong Qiao
(74) *Attorney, Agent, or Firm* — Foley & Lardner LLP

(57)                ABSTRACT

One embodiment of the present invention relates to a thermoplastic elastomer composition or a shaped article thereof. The thermoplastic elastomer composition is a composition including 100 parts by mass of an ethylene/α-olefin/non-conjugated polyene copolymer (A); 20 to 80 parts by mass of a propylene polymer (B) having a melt flow rate (measured at 230° C. under 2.16 kg load in accordance with ASTM D 1238-65T) of 1 to 100 g/10 min; and 0.1 to 50 parts by mass of an inorganic filler (C); or is a composition obtained by dynamically crosslinking 100 parts by mass of an ethylene/α-olefin/non-conjugated polyene copolymer (A); 20 to 80 parts by mass of the propylene polymer (B); 0.1 to 50 parts by mass of an inorganic filler (C); and a crosslinking agent (D).

9 Claims, No Drawings

THERMOPLASTIC ELASTOMER COMPOSITION AND SHAPED ARTICLE THEREOF

CROSS-REFERENCE TO RELATED APPLICATIONS

The present application claims priority under 37 U.S.C. § 371 to International Patent Application No. PCT/JP2021/013503, filed Mar. 30, 2021, which claims priority to and the benefit of Japanese Patent Application No. 2020-063800, filed on Mar. 31, 2020. The contents of these applications are hereby incorporated by reference in their entireties.

TECHNICAL FIELD

One embodiment of the present invention relates to a thermoplastic elastomer composition or a shaped article thereof.

BACKGROUND ART

Olefin-containing thermoplastic elastomer compositions are materials having excellent shaping properties and appropriate flexibility and rubber elasticity, and are used in various fields such as parts of automobiles and other vehicles, mechanical parts, electrical parts, home appliances, daily miscellaneous goods and kitchen utensils.

Examples of the vehicle parts using an olefin-containing thermoplastic elastomer composition include an automobile interior material such as a skin material (an instrumental panel) covering an airbag device. When the airbag device is operated, a gas generator (an inflator) generates a gas to inflate the airbag, and the expansive force of the airbag breaks the instrumental panel as well as the airbag cover. Thus, the instrumental panel needs to be a material that can be easily broken and allows the airbag to be reliably deployed.

For example, Patent Literatures 1 and 2 disclose thermoplastic elastomer compositions that may be used for instrumental panels.

However, Patent Literatures 1 and 2 are silent with respect to the breakability of the instrumental panels.

CITATION LIST

Patent Literature

Patent Literature 1: JP-A-2002-206034
Patent Literature 2: WO 2016/039310

SUMMARY OF INVENTION

Technical Problem

After extensive studies, the present inventors have found that while appropriately small values of tensile characteristics, specifically, elongation at break and tear strength are advantageous in obtaining an instrumental panel that is easily broken by the expansive force of an airbag, excessive lowness in the values of elongation at break and tear strength may cause sheet rupture during sheet formation or vacuum forming. That is, the conventional shaped articles are incapable of concurrently satisfying excellent shaping properties and appropriately small values of elongation at break and tear strength.

One embodiment of the present invention provides a thermoplastic elastomer composition that has excellent shaping properties and can also form a shaped article having appropriately small values of tensile elongation at break and tear strength.

Solution to Problem

The present inventors carried out further studies and have found that the problems discussed above can be solved according to the configuration examples below. Some configuration examples of the present invention are as follows.

In the present specification, the numerical ranges written as "A to B" indicate A or more and B or less.

[1] A thermoplastic elastomer composition comprising:
100 parts by mass of an ethylene/α-olefin/non-conjugated polyene copolymer (A);
20 to 80 parts by mass of a propylene polymer (B); and
0.1 to 50 parts by mass of an inorganic filler (C),
the propylene polymer (B) having a melt flow rate (measured at 230° C. under 2.16 kg load in accordance with ASTM D 1238-65T) of 1 to 100 g/10 min.

[2] A thermoplastic elastomer composition obtained by dynamically crosslinking:
100 parts by mass of an ethylene/α-olefin/non-conjugated polyene copolymer (A);
20 to 80 parts by mass of a propylene polymer (B) having a melt flow rate (measured at 230° C. under 2.16 kg load in accordance with ASTM D 1238-65T) of 1 to 100 g/10 min;
0.1 to 50 parts by mass of an inorganic filler (C); and
a crosslinking agent (D).

[3] The thermoplastic elastomer composition according to [2], which satisfies the following (1) to (3):
(1) a Shore A hardness (instantaneous value) is 40 to 80 (as measured in accordance with JIS K 6253 with respect to a 6 mm thick sample including a laminate of three 2 mm thick sheets of the thermoplastic elastomer composition);
(2) a tear strength is 16 N/mm or more and less than 27 N/mm (as measured in accordance with JIS K 6252-1 with respect to a 2 mm thick sheet of the thermoplastic elastomer composition); and
(3) an elongation at break is 200% or more and less than 450% (as measured in accordance with JIS K 6251 with respect to a 2 mm thick sheet of the thermoplastic elastomer composition).

[4] The thermoplastic elastomer composition according to [2] or [3], wherein the content of the crosslinking agent (D) is 0.5 to 5.0 parts by mass with respect to 100 parts by mass of the copolymer (A).

[5] The thermoplastic elastomer composition according to any of [1] to [4], which comprises an at least partially crosslinked ethylene/α-olefin/non-conjugated polyene copolymer.

[6] The thermoplastic elastomer composition according to any of [1] to [5], wherein the inorganic filler (C) is talc or calcium carbonate.

[7] A shaped article comprising the thermoplastic elastomer composition described in any of [1] to [6].

[8] A vehicle part comprising the shaped article described in [7].

[9] The vehicle part according to [8], which is an interior skin material.

[10] The vehicle part according to [8] or [9], which is an instrumental panel.

Advantageous Effects of Invention

The thermoplastic elastomer composition provided according to one embodiment of the present invention has excellent shaping properties and can also form a shaped article having appropriately small values of tensile elongation at break and tear strength. In particular, according to one embodiment of the present invention, a shaped article can be formed that has practically necessary mechanical properties such as hardness, tensile characteristics and compression set and also has appropriately small values of elongation at break and tear strength in tensile characteristics.

DESCRIPTION OF EMBODIMENTS

Hereinbelow, an embodiment of the present invention will be described in detail. However, it should be construed that the scope of the present invention is not limited to the configurations of the following embodiment.

<<Thermoplastic Elastomer Compositions>>

A thermoplastic elastomer composition according to one embodiment of the present invention (hereinafter, also written as the "present composition") is:

a composition including 100 parts by mass of an ethylene/α-olefin/non-conjugated polyene copolymer (A); 20 to 80 parts by mass of a propylene polymer (B) having a melt flow rate (measured at 230° C. under 2.16 kg load in accordance with ASTM D 1238-65T) of 1 to 100 g/10 min; and 0.1 to 50 parts by mass of an inorganic filler (C) (hereinafter, this composition is also written as the "present composition 1"); or a composition obtained by dynamically crosslinking 100 parts by mass of an ethylene/α-olefin/non-conjugated polyene copolymer (A); 20 to 80 parts by mass of a propylene polymer (B) having a melt flow rate (measured at 230° C. under 2.16 kg load in accordance with ASTM D 1238-65T) of 1 to 100 g/10 min; 0.1 to 50 parts by mass of an inorganic filler (C); and a crosslinking agent (D) (hereinafter, this composition is also written as the "present composition 2").

<Ethylene/α-Olefin/Non-Conjugated Polyene Copolymers (A)>

The ethylene/α-olefin/non-conjugated polyene copolymer (A) (hereinafter, also written as the "component (A)"; the same applies to other components) is not particularly limited as long as containing constituent units derived from ethylene, constituent units derived from an α-olefin, and constituent units derived from a non-conjugated polyene, and may be synthesized by a conventionally known method, for example, by copolymerizing ethylene, an α-olefin and a non-conjugated polyene.

The component (A) contained in the present composition may be a single copolymer, or two or more kinds of copolymers.

Based on the total of the content of the ethylene-derived constituent units (hereinafter, also written as the "ethylene content") and the content of the α-olefin-derived constituent units (hereinafter, also written as the "α-olefin content") in the component (A) taken as 100 mol %, the ethylene content is preferably 50 mol % or more, more preferably 55 mol % or more, and still more preferably 60 mol % or more, and is more preferably 95 mol % or less, still more preferably 85 mol % or less, and particularly preferably 83 mol % or less for reasons such as because shaped articles having excellent mechanical strength and flexibility can be easily obtained.

The ethylene content and the α-olefin content may be determined by $^{13}$C-NMR measurement.

The α-olefin, although not particularly limited, is preferably a C3-C20 α-olefin. Specific examples of the C3-C20 α-olefins include propylene, 1-butene, 1-pentene, 1-hexene, 4-methyl-1-pentene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene, 9-methyl-1-decene, 11-methyl-1-dodecene and 12-ethyl-1-tetradecene. The α-olefins may be used singly, or two or more may be used in combination.

Among the α-olefins, propylene, 1-butene, 4-methyl-1-pentene, 1-hexene and 1-octene are preferable, and propylene is more preferable.

Based on the total of the ethylene content and the α-olefin content in the component (A) taken as 100 mol %, the α-olefin content is preferably 50 mol % or less, more preferably 45 mol % or less, and still more preferably 40 mol % or less, and is more preferably 5 mol % or more, still more preferably 15 mol % or more, and particularly preferably 17 mol % or more for reasons such as because shaped articles having excellent mechanical strength and flexibility can be easily obtained.

Examples of the non-conjugated polyenes include chain non-conjugated dienes, cyclic non-conjugated dienes and trienes. The non-conjugated polyenes may be used singly, or two or more may be used in combination.

Examples of the chain non-conjugated dienes include 1,4-hexadiene, 1,5-hexadiene, 1,6-hexadiene, 3-methyl-1,4-hexadiene, 4-methyl-1,4-hexadiene, 5-methyl-1,4-hexadiene, 4,5-dimethyl-1,4-hexadiene, 7-methyl-1,6-octadiene, 3,7-dimethyl-1,6-octadiene, 5,7-dimethyl-1,7-octadiene, 8-methyl-4-ethylidene-1,7-nonadiene and 4-ethylidene-1,7-undecadiene.

Examples of the cyclic non-conjugated dienes include tetrahydroindene, methyltetrahydroindene, 5-ethylidene-2-norbornene, 5-methylene-2-norbornene, 5-propenyl-2-norbornene, 5-isopropylidene-2-norbornene, 5-vinylidene-2-norbornene, 6-chloromethyl-5-isopropenyl-2-norbornene, 5-vinyl-2-norbornene, 5-isopropenyl-2-norbornene, 5-isobutenyl-2-norbornene, 5-cyclohexylidene-2-norbornene, cyclopentadiene, dicyclopentadiene, cyclooctadiene and norbornadiene.

Examples of the trienes include 2,3-diisopropylidene-5-norbornene, 2-ethylidene-3-isopropylidene-5-norbornene, 2-propenyl-2,2-norbornadiene, 4-ethylidene-8-methyl-1,7-nonadiene, 6,10-dimethyl-1,5,9-undecatriene, 5,9-dimethyl-1,4,8-decatriene, 6,9-dimethyl-1,5,8-decatriene, 6,8,9-trimethyl-1,5,8-decatriene, 6-ethyl-10-methyl-1,5,9-undecatriene, 4-ethylidene-1,6-octadiene, 7-methyl-4-ethylidene-1,6-octadiene, 7-methyl-4-ethylidene-1,6-nonadiene, 7-ethyl-4-ethylidene-1,6-nonadiene, 6,7-dimethyl-4-ethylidene-1,6-octadiene, 6,7-dimethyl-4-ethylidene-1,6-nonadiene, 4-ethylidene-1,6-decadiene, 7-methyl-4-ethylidene-1,6-decadiene, 7-methyl-6-propyl-4-ethylidene-1,6-octadiene, 4-ethylidene-1,7-nonadiene and 4-ethylidene-1,7-undecadiene.

Among the non-conjugated polyenes, 1,4-hexadiene, 5-ethylidene-2-norbornene, 5-vinyl-2-norbornene, cyclopentadiene, dicyclopentadiene and 4-ethylidene-8-methyl-1, 7-nonadiene are preferable, and 5-ethylidene-2-norbornene and 5-vinyl-2-norbornene are more preferable.

The content of the non-conjugated polyene-derived constituent units in the component (A) is such that the iodine value is preferably 1 or more, more preferably 5 or more, and particularly preferably 10 or more, and is preferably 50 or less, more preferably 40 or less, and particularly preferably 30 or less. When the iodine value of the component (A) is in the above range, the component (A) in the thermoplastic elastomer composition can be easily (partially) crosslinked in a well balanced manner.

The content of the constituent units derived from the non-conjugated polyene is usually 2 to 20 mass % of all the constituent units constituting the component (A) taken as 100 mass %.

For reasons such as because the component (A) can easily form a uniform mixture together with other components, the Mooney viscosity [$ML_{(1+4)}$ 125° C.] measured in accordance with ASTM D 1646-19a is preferably 10 or more, and more preferably 30 or more, and is preferably 250 or less, and more preferably 150 or less.

When the Mooney viscosity of the component (A) itself is not within the above range, the component may be treated as required by a conventionally known method, for example, may be extended with an oil extender such as a softener described below. The oil extender is preferably a petroleum softener such as a paraffin process oil. The amount of the oil extender used for the oil extension is preferably such that the Mooney viscosity of the extended component falls in the above range, and is, for example, 0 to 150 parts by mass with respect to 100 parts by mass of the component (A).

The intrinsic viscosity [η] of the component (A) measured in a decalin solvent at 135° C. is preferably 1 dl/g or more, and more preferably 1.5 dl/g or more, and is preferably 10 dl/g or less, and more preferably 8 dl/g or less.

In the present composition, the component (A) may be present in any crosslinked state such as uncrosslinked, partially crosslinked or completely crosslinked. When the component (A) that is used is at least partially crosslinked, the timing of the crosslinking is not particularly limited. For example, the component (A) may be at least partially (dynamically) crosslinked before being mixed together with the components (B) and (C) constituting the present composition, or the component (A) may be at least partially (dynamically) crosslinked after or while being mixed together with other components constituting the present composition.

In the present composition 2, the component (A) contained in the composition is at least partially crosslinked.

It is preferable that the component (A) be at least partially crosslinked. When the component (A) has a high degree of crosslinking, in particular, when the component (A) is used with the component (B) having an MFR in the range described later and the component (C) ensures that the present composition will give a shaped article that is resistant to elongation and easily attains a tensile elongation at break controlled in the predetermined range. Thus, the present composition including such components can produce instrumental panels that are easily broken.

Incidentally, the compression set of a shaped article produced from the present composition tends to be lowered with increasing degree of crosslinking of the component (A). Therefore, whether the degree of crosslinking of the component (A) is high or low can be estimated from the compression set of a shaped article produced from the present composition.

For reasons such as because a shaped article that has a practically necessary hardness and still has appropriately small values of elongation at break and tear strength in tensile characteristics can be easily obtained, the content of the component (A) in the present composition is preferably 50 mass % or less, and more preferably 10 to 50 mass %.

<Propylene Polymers (B)>

The component (B) is a polymer other than the component (A).

The component (B) is a polymer that contains propylene-derived constituent units in an amount of 50 mol % or more of all the constituent units constituting the polymer. The content of the propylene-derived constituent units in the component (B) is preferably 90 mol % or more.

The component (B) contained in the present composition may be a single polymer, or two or more kinds of polymers.

The component (B) may be a propylene homopolymer, or may be a copolymer of propylene and a comonomer other than propylene.

The structure of the component (B) is not particularly limited. For example, the moiety composed of propylene-derived constituent units may be an isotactic structure, a syndiotactic structure or an atactic structure, and is preferably an isotactic structure. In the case of the copolymer, the copolymer may be a random copolymer, a block copolymer or a graft copolymer.

The comonomer may be any comonomer copolymerizable with propylene. A C2 or C4-C10 α-olefin is preferable. Specific examples thereof include ethylene, 1-butene, 1-pentene, 4-methyl-1-pentene, 1-hexene, 1-heptene, 1-octene, 1-nonene and 1-decene. Among these, ethylene, 1-butene, 1-pentene, 4-methyl-1-pentene, 1-hexene, 1-heptene and 1-octene are preferable. A single comonomer, or two or more comonomers may be used.

From points of view such as flexibility, the content of the comonomer-derived constituent units in the copolymer is preferably 10 mol % or less.

The component (B) may be synthesized by a conventionally known method or may be purchased from the market.

The component (B) may be a crystalline polymer or may be an amorphous polymer. Here, the term crystalline means that the polymer shows a melting point (Tm) in differential scanning calorimetry (DSC).

When the component (B) is a crystalline polymer, the melting point thereof (measured in accordance with JIS K 7121) is preferably 100° C. or above, and more preferably 120° C. or above, and is preferably 180° C. or below, and more preferably 170° C. or below from points of view such as heat resistance.

The MFR of the component (B) (measured at 230° C. under 2.16 kg load in accordance with ASTM D 1238-65T) is 1 to 100 g/10 min, and is preferably 2 g/10 min or more, more preferably 3 g/10 min or more, and still more preferably 5 g/10 min or more, and preferably 80 g/10 min or less, more preferably 70 g/10 min or less, and still more preferably 55 g/10 min or less.

By virtue of the component (B) having an MFR in the above range, the composition that is obtained easily attains excellent shaping properties and can easily form a shaped article having appropriately small values of elongation at break and tear strength in tensile characteristics.

The content of the component (B) in the present composition, based on 100 parts by mass of the component (A), is 20 to 80 parts by mass, and is preferably 25 parts by mass or more, and more preferably 30 parts by mass or more, and preferably 70 parts by mass or less, more preferably 60 parts by mass or less, and particularly preferably 50 parts by mass or less.

By virtue of the content of the component (B) being in the above range, a shaped article can be easily obtained that has a practically necessary hardness and still has appropriately small values of elongation at break and tear strength in tensile characteristics.

<Inorganic Fillers (C)>

The component (C) is not particularly limited. Examples thereof include carbonate salts, sulfate salts, phosphate salts, oxides, hydroxides, silicon-containing inorganic substances, sulfides, carbon materials and cements.

The component (C) contained in the present composition may be a single component, or two or more kinds of components.

Examples of the carbonate salts include calcium carbonate, barium carbonate, magnesium carbonate and zinc carbonate.

Examples of the sulfate salts include calcium sulfate, barium sulfate and magnesium sulfate.

Examples of the phosphate salts include calcium phosphate.

Examples of the oxides include zinc oxide, iron oxide, calcium oxide, magnesium oxide, aluminum oxide, titanium oxide and barium oxide.

Examples of the hydroxides include magnesium hydroxide.

Examples of the silicon-containing inorganic substances include calcium silicate, clays (including, for example, pyrophyllite clay and calcined clay), kaolin, talc, silicas (including, for example, fumed silica, calcined silica, precipitated silica, ground silica and molten silica), diatomaceous earth, mica, asbestos, glass fibers, glass beads, Shirasu balloons, silicic acid clay and zeolites.

Examples of the sulfides include tungsten sulfide and molybdenum sulfide.

Examples of the carbon materials include graphite and carbon black.

Among those described above, calcium carbonate, barium carbonate, magnesium carbonate, zinc carbonate, calcium sulfate, barium sulfate, magnesium sulfate, zinc oxide, iron oxide, calcium oxide, magnesium oxide, aluminum oxide, titanium oxide, barium oxide, calcium silicate, clays, kaolin, talc and carbon black are preferable. Talc, clays and calcium carbonate are more preferable. Talc and calcium carbonate are still more preferable. Talc is particularly preferable.

The shape of the component (C) is not particularly limited. For example, the shape may be any of various shapes such as powders, spheres and flakes, but is preferably spherical.

The average particle size (the d50 value obtained by a laser diffraction method) of the component (C) is not particularly limited. For reasons such as because a shaped article can be easily obtained that has a practically necessary hardness and still has appropriately small values of elongation at break and tear strength in tensile characteristics, this average particle size is preferably 10.0 μm or less, more preferably 9.0 μm or less, and still more preferably 0.5 μm or more and 5.0 μm or less.

The component (C) is preferably composed of an inorganic substance. The surface of the inorganic substance may be coated with, for example, a fatty acid or a fatty acid derivative.

Examples of the fatty acids include linear saturated fatty acids such as lauric acid, myristic acid, palmitic acid, stearic acid, arachic acid, behenic acid, lignoceric acid, cerotic acid, montanic acid and melissic acid, and unsaturated fatty acids such as cetoleic acid and sorbic acid.

Examples of the fatty acid derivatives include fatty acid esters and fatty acid metal salts. The fatty acid esters are preferably esters of higher fatty acids having 8 or more carbon atoms, with examples including stearyl stearate, lauryl stearate, stearyl palmitate, lauryl palmitate, glyceride tristearate and glyceride tripalmitate. Examples of the fatty acid metal salts include sodium salts, potassium salts, calcium salts, aluminum salts and zinc salts of C10-C25 fatty acids.

The content of the component (C) in the present composition, based on 100 parts by mass of the component (A), is 0.1 to 50 parts by mass, and is preferably 1 part by mass or more, more preferably 5 parts by mass or more, still more preferably 7 parts by mass or more, further preferably 10 parts by mass or more, and particularly preferably 15 parts by mass or more, and preferably 45 parts by mass or less, more preferably 40 parts by mass or less, still more preferably 35 parts by mass or less, and particularly preferably 30 parts by mass or less.

By virtue of the content of the component (C) being in the above range, a shaped article can be easily obtained that has a practically necessary hardness and still has appropriately small values of elongation at break and tear strength in tensile characteristics.

<Further Additives>

The present composition may include further additives in addition to the components (A) to (C) as required without impairing the object of the present invention. Examples of the further additives include styrene thermoplastic elastomers, propylene/α-olefin random copolymers, crosslinking agents (D), crosslinking aids, softeners, heat stabilizers, antistatic agents, weather stabilizers, antiaging agents, fillers, flame retardants and colorants.

The further additives belonging to the same type may be used singly, or two or more may be used in combination.

The present composition may or may not contain an ethylene polymer, and is preferably free from ethylene polymers. Specific examples of the ethylene polymers include ethylene homopolymers and copolymers of ethylene and one or more C3-C20 α-olefins.

[Styrene Thermoplastic Elastomers and Propylene/α-Olefin Random Copolymers]

The shaped articles with good appearance may be easily formed by using a styrene thermoplastic elastomer or a propylene/α-olefin random copolymer. In the case of vehicle parts and other shaped articles that are frequently required to be of sophisticated design, the good appearance of these shaped articles is advantageous in that the painting step for enhancing the design may be omitted.

Specific examples of the styrene thermoplastic elastomers include styrene/isoprene block copolymers, hydrogenated products of styrene/isoprene block copolymers (SEP), hydrogenated products of styrene/isoprene/styrene block copolymers (SEPS; polystyrene/polyethylene/propylene/polystyrene block copolymers), styrene/butadiene copolymers (for example, styrene/butadiene block copolymers), and hydrogenated products of styrene/butadiene block copolymers (SEBS; polystyrene/polyethylene/butylene/polystyrene block copolymers).

Examples of the propylene/α-olefin random copolymers include copolymers obtained from propylene, one, or two or more kinds of α-olefins and, if necessary, one, or two or more kinds of comonomers copolymerizable with propylene.

The α-olefin is preferably a C2 or C4-C10 α-olefin. Specific examples thereof include ethylene, 1-butene, 1-pentene, 4-methyl-1-pentene, 1-hexene, 1-heptene, 1-octene, 1-nonene and 1-decene. Among these, ethylene, 1-butene, 1-pentene, 4-methyl-1-pentene, 1-hexene, 1-heptene and 1-octene are preferable.

[Crosslinking Agents (D)]

The component (D) is preferably used when the component (A) in the present composition 1 is to be partially or completely crosslinked, in particular, when the components added to the present composition 1 are to be dynamically crosslinked. The component (D) is used in the present composition 2.

The component (D) is not particularly limited and may be a conventionally known crosslinking agent. Specific examples thereof include organic peroxides, sulfur, sulfur compounds and phenolic crosslinking agents. Among these, organic peroxides are preferable for reasons such as because such crosslinking agents are unlikely to add colors to the present composition that is obtained as well as to shaped articles of the composition, and the hue of the shaped articles can be easily controlled.

Examples of the organic peroxides include dicumyl peroxide, di-tert-butyl peroxide, 2,5-dimethyl-2,5-di-(tert-butylperoxy)hexane, 2,5-dimethyl-2,5-di(tert-butylperoxy)hexyne-3,1,3-bis(tert-butylperoxyisopropyl)benzene, 1,1-bis(tert-butylperoxy)-3,3,5-trimethylcyclohexane, n-butyl-4,4-bis(tert-butylperoxy)valerate, benzoyl peroxide, p-chlorobenzoyl peroxide, 2,4-dichlorobenzoyl peroxide, tert-butyl peroxybenzoate, tert-butyl perbenzoate, tert-butyl peroxyisopropyl carbonate, diacetyl peroxide, lauroyl peroxide and tert-butylcumyl peroxide.

Among those described above, 2,5-dimethyl-2,5-di(tert-butylperoxy)hexane, 2,5-dimethyl-2,5-di(tert-butylperoxy)hexyne-3,1,3-bis(tert-butylperoxyisopropyl)benzene, 1,1-bis(tert-butylperoxy)-3,3,5-trimethylcyclohexane and n-butyl-4,4-bis(tert-butylperoxy)valerate are preferable from points of view such as odor and scorch stability.

When the present composition contains the component (D), the content of the component (D) in the present composition, based on 100 parts by mass of the component (A), is preferably 0.5 parts by mass or more, more preferably 0.6 parts by mass or more, and still more preferably 0.7 parts by mass or more, and is preferably 5.0 parts by mass or less, more preferably 2.9 parts by mass or less, still more preferably 2.0 parts by mass or less, and particularly preferably 1.5 parts by mass or less for reasons such as because a shaped article can be easily obtained that has an excellent balance between hardness, and elongation at break and tear strength.

[Crosslinking Aids]

When the component (D) is used, it is preferable to use a crosslinking aid for purposes such as to ensure uniform crosslinking reaction.

The crosslinking aid is not particularly limited and may be selected appropriately from conventionally known crosslinking aids in accordance with the type of the component (D).

Examples of the crosslinking aids useful when an organic peroxide is used as the component (D) include sulfur, p-quinonedioxime, p,p'-dibenzoylquinonedioxime, N-methyl-N,4-dinitrosoaniline, nitrobenzene, diphenylguanidine, trimethylolpropane-N,N'-m-phenylenedimaleimide, and vinyl or methacrylate monomers such as divinylbenzene, triallyl cyanurate, vinyl butyrate, vinyl stearate, ethylene glycol dimethacrylate, diethylene glycol dimethacrylate, polyethylene glycol dimethacrylate, trimethylolpropane trimethacrylate and allyl methacrylate.

Among those described above, divinylbenzene is preferable because it has good compatibility with the components for constituting the present composition and also because it has an effect of solubilizing the organic peroxide to act also as a dispersion aid for the organic peroxide, thereby ensuring that crosslinking will occur uniformly during heat treatment. Thus, the present composition that is obtained tends to easily attain a good balance between fluidity and other properties when divinylbenzene is used as the crosslinking aid.

When the present composition contains the crosslinking aid, the content of the crosslinking aid in the present composition, based on 100 parts by mass of the component (A), is preferably 0.5 parts by mass or more, more preferably 0.6 parts by mass or more, and still more preferably 0.7 parts by mass or more, and is preferably 5.0 parts by mass or less, more preferably 2.9 parts by mass or less, still more preferably 2.0 parts by mass or less, and particularly preferably 1.5 parts by mass or less.

[Softeners]

The present composition preferably contains a softener for purposes such as to control the fluidity or the hardness.

Specific examples of the softeners include petroleum softeners such as process oils, lubricating oils, paraffins, liquid paraffins, polyethylene waxes, polypropylene waxes, petroleum asphalts and vaselines; coal tar softeners such as coal tars and coal tar pitches; fatty oil softeners such as castor oil, linseed oil, rapeseed oil, soybean oil and coconut oil; tall oils; rubber substitutes (factices); waxes such as beeswax, carnauba wax and lanolin; fatty acids and fatty acid salts such as ricinoleic acid, palmitic acid, stearic acid, barium stearate, calcium stearate and zinc laurate; naphthenic acid; pine oil, rosins and derivatives thereof; synthetic polymer softeners such as terpene resins, petroleum resins, coumarone-indene resins and atactic polypropylenes; ester softeners such as dioctyl phthalate, dioctyl adipate and dioctyl sebacate; microcrystalline waxes, liquid polybutadienes, modified liquid polybutadienes, liquid polyisoprenes, terminal-modified polyisoprenes, terminal-hydrogenated modified polyisoprenes, liquid thiokols and hydrocarbon synthetic lubricating oils.

Among those described above, petroleum softeners, particularly process oils, are preferable.

For example, the softener may be used by being mixed together beforehand with the component (A) (oil extension) as described hereinabove, may be used when preparing the present composition, or may be post-added when the components constituting the present composition are dynamically heat treated.

When the present composition contains the softener, the content of the softener in the present composition, based on 100 parts by mass of the component (A), is usually 10 parts by mass or more, preferably 15 parts by mass or more, and more preferably 20 parts by mass or more, and is usually 200 parts by mass or less, preferably 150 parts by mass or less, and more preferably 100 parts by mass or less.

When the content of the softener is in the above range, the present composition that is obtained tends to easily attain fluidity suited for shaping and also tends to easily form a shaped article having excellent mechanical properties, heat resistance and thermal aging resistance.

<Methods for Production and Properties of Present Compositions>

The present composition may be produced by mixing and kneading the components (A) to (C) and, if necessary, the further additives described hereinabove.

The mixing and kneading is preferably performed with a conventionally known mixing/kneading machine such as a Banbury mixer, a mixing roll, a Henschel mixer, a kneader, or a single-screw or twin-screw extruder. The order in which the components are added to the mixing and kneading process is not particularly limited.

The present composition 1 is preferably produced by dynamically crosslinking (dynamically heat-treating) the components (A) to (C) described hereinabove and, if necessary, the further additives described hereinabove. The present composition 2 is produced by dynamically crosslinking (dynamically heat-treating) the components (A) to (D) described hereinabove and, if necessary, the further additives described hereinabove.

For example, the components (A) to (C) and, if necessary, the further additives may be dynamically crosslinked by being mixed and kneaded in a mixing/kneading device while performing heating. A shear force is preferably applied during the crosslinking. When the present composition 1 is dynamically crosslinked, it is preferable that the further additives that are used include at least the crosslinking agent.

The composition resulting from the dynamic crosslinking includes a component formed by crosslinking of at least part of the component (A). Here, the phrase "crosslinking of at least part" means that the gel content is in the range of 5 to 98 mass %, preferably 10 to 95 mass %.

The dynamic crosslinking is preferably performed in a hermetic device, and is preferably carried out in an atmosphere of an inert gas such as nitrogen or carbon dioxide.

The heating temperature in the dynamic crosslinking is usually 125° C. or above, and preferably 145° C. or above, and is usually 280° C. or below, and preferably 240° C. or below. The amount of the mixing/kneading time is usually 1 minute or more, and preferably 3 minutes or more, and is usually 30 minutes or less, and preferably 20 minutes or less.

The shear force applied during the mixing and kneading process may be such that the maximum shear rate is, for example, 10 sec$^{-1}$ or more, preferably 100 sec$^{-1}$ or more, more preferably 1,000 sec$^{-1}$ or more, and still more preferably 2,000 sec$^{-1}$ or more, and is, for example 100,000 sec$^{-1}$ or less, preferably 50,000 sec$^{-1}$ or less, more preferably 10,000 sec$^{-1}$ or less, and still more preferably 7,000 sec$^{-1}$ or less.

For reasons such as because the composition exhibits excellent shaping properties, the melt flow rate of the present composition (measured at 230° C. under 10 kg load in accordance with JIS K 7210) is preferably 1 g/10 min or more and less than 170 g/10 min, more preferably 1 to 160 g/10 min, still more preferably 1 g/10 min or more and less than 130 g/10 min, further preferably 1 g/10 min or more and less than 110 g/10 min, furthermore preferably 1 g/10 min or more and less than 100 g/10 min, and particularly preferably 1 g/10 min or more and less than 50 g/10 min.

For reasons such as because the composition exhibits excellent shaping properties, the melt flow rate of the present composition (measured at 230° C. under 5 kg load in accordance with JIS K 7210) is preferably 6.0 g/10 min or less, more preferably 5.0 g/10 min or less, and still more preferably less than 4.0 g/10 min.

The Shore A hardness (instantaneous value) of the present composition 2 (measured in accordance with JIS K 6253) is preferably 40 or more, more preferably 50 or more, and still more preferably 55 or more, and is preferably 80 or less, more preferably 75 or less, and still more preferably 70 or less.

When the Shore A hardness (instantaneous value) is in the above range, the present composition 2 can easily form a shaped article that has excellent design properties such as texture and upscale appearance and also has practically necessary scratch resistance. The present composition 2 may be suitably used for vehicle parts, in particular, instrumental panels.

Specifically, the Shore A hardness (instantaneous value) may be measured by a method described later in Examples.

The elongation at break of the present composition 2 (measured in accordance with JIS K 6251) is preferably 200% or more and less than 450%, and more preferably 200% or more and less than 350%.

When the elongation at break is in the above range, the present composition 2 can easily form a shaped article having an appropriately small value of elongation at break, and such a shaped article when used as, for example, an instrumental panel can be easily broken by the expansive force of an airbag.

Specifically, the elongation at break may be measured by a method described later in Examples.

The tear strength of the present composition 2 (measured in accordance with JIS K 6252-1) is preferably 16 N/mm or more and less than 27 N/mm, more preferably 16 to 24 N/mm, and still more preferably 16 N/mm or more and less than 21 N/mm.

When the tear strength is in the above range, the present composition 2 can easily form a shaped article having an appropriately small value of tear strength, and such a shaped article when used as, for example, an instrumental panel can be easily broken by the expansive force of an airbag.

Specifically, the tear strength may be measured by a method described later in Examples.

The compression set of the present composition 2 (measured in accordance with JIS K 6262) is preferably 15% or more, more preferably 16% or more, still more preferably 18% or more, and particularly preferably 19% or more, and is preferably 30% or less, more preferably 27% or less, still more preferably 25% or less, and particularly preferably 23% or less.

The compression set within the above range is advantageous in that, for example, a shaped article having excellent properties such as texture can be easily formed.

Specifically, the compression set may be measured by a method described later in Examples.

<<Shaped Articles>>

A shaped article according to one embodiment of the present invention is not particularly limited as long as the shaped article includes the present composition. The shaped article may be formed by any known shaping method in accordance with the use application. Examples of the shaping methods include, for example, press molding, injection molding, extrusion, calendering, hollow forming, vacuum forming and compression molding.

The shaped article is suitably used for a vehicle part. The vehicle part is preferably an interior skin material.

Examples of the interior skin materials include instrumental panels, door trims, consoles and armrests. Among these, instrumental panels are particularly preferable for reasons such as because the advantageous effects of the present invention are produced more prominently.

Besides the vehicle parts, the shaped articles may be used in other applications such as, for example, sports equipment and building materials.

EXAMPLES

The present invention will be described in greater detail based on Examples hereinbelow. However, it should be construed that the scope of the present invention is not limited to such Examples.

<Raw Materials>

The raw materials used in Examples and Comparative Examples below are as follows.

"Copolymer (A-1)": Oil-Extended ethylene/propylene/non-conjugated diene copolymer rubber (EPDM, trade name: 3072EPM; manufactured by Mitsui Chemicals, Inc., ethylene content=64 mass %, type of non-conjugated diene: 5-ethylidene-2-norbornene, non-conjugated diene content=5.4 mass %, Mooney viscosity [$ML_{(1+4)}$ 125° C.]=51, amount of oil extender per 100 parts by mass of rubber component=40 (PHR)).

The numerical values for the copolymer (A-1) in Table 1 indicate the amount added of the rubber component alone excluding the amount of the oil extender. A paraffin process oil ("PW-100" manufactured by Idemitsu Kosan Co., Ltd., a softener described later) was used for the oil extension of the copolymer (A-1).

"Propylene polymer (B-1)": Propylene/ethylene block copolymer (trade name: Prime Polypro J709QG, manufactured by Prime Polymer Co., Ltd., MFR (measured at 230° C. under 2.16 kg load in accordance with ASTM D 1238-65T)=55 g/10 min), melting point measured by DSC: 152° C.).

"Propylene polymer (B-2)": Propylene/ethylene block copolymer (trade name: EL-Pro P740J; manufactured by SCG Chemicals, MFR (measured at 230° C. under 2.16 kg load in accordance with ASTM D 1238-65T)=25 g/10 min), melting point measured by DSC: 163° C.).

"Propylene polymer (B-3)": Propylene/ethylene block copolymer (trade name: EL-Pro P440J; manufactured by SCG Chemicals, MFR (measured at 230° C. under 2.16 kg load in accordance with ASTM D 1238-65T)=5 g/10 min), melting point measured by DSC: 163° C.).

"Propylene polymer (B'-4)": Propylene/ethylene block copolymer (trade name: Prime Polypro E-150GK, manufactured by Prime Polymer Co., Ltd., MFR (measured at 230° C. under 2.16 kg load in accordance with ASTM D 1238-65T)=0.5 g/10 min), melting point measured by DSC: 164° C.).

"Propylene polymer (B-5)": Propylene/ethylene random copolymer (crystalline resin, trade name: Prime Polypro J229E, manufactured by Prime Polymer Co., Ltd., MFR (measured at 230° C. under 2.16 kg load in accordance with ASTM D 1238-65T)=50 g/10 min), melting point measured by DSC: 148° C.).

"Propylene polymer (B-6)": Propylene homopolymer (crystalline resin, trade name: Prime Polypro J108M, manufactured by Prime Polymer Co., Ltd., MFR (measured at 230° C. under 2.16 kg load in accordance with ASTM D 1238-65T)=45 g/10 min), melting point measured by DSC: 165° C.).

"Inorganic filler (C-1)": Talc (trade name: HI-FILLER #5000PJ, manufactured by Matsumura Sangyo Co., Ltd., particle size (d50 value measured by a laser diffraction method)=4.5 μm).

"Inorganic filler (C-2)": Calcium carbonate (trade name: MAX 6080K, manufactured by Takehara Chemical Industrial Co., Ltd., particle size (d50 value measured by a laser diffraction method)=not more than 10 μm).

"Softener": Paraffin process oil (trade name: Diana Process Oil PW-100, manufactured by Idemitsu Kosan Co., Ltd.).

"Crosslinking aid": Divinylbenzene (trade name: DVB-810, manufactured by NIPPON STEEL Chemical & Material Co., Ltd.).

"Crosslinking agent (D-1)": Organic peroxide (2,5-dimethyl-2,5-di(tert-butylperoxy)hexane, trade name: PERHEXA 25B, manufactured by NOF CORPORATION).

<Mass Fractions of Constituent Units>

The mass fractions (mass %) of the constituent units constituting EPDM in the copolymer (A-1) were determined from values measured by $^{13}$C-NMR. Specifically, the mass fractions were calculated from a $^{13}$C-NMR spectrum of the copolymer (A-1) measured with nuclear magnetic resonance device ECX400P (manufactured by JEOL Ltd.) under conditions where measurement temperature: 120° C., measurement solvent: orthodichlorobenzene/deuterated benzene=4/1 (by volume), and number of scans: 8000.

<Mooney Viscosity>

The Mooney viscosity of the copolymer (A-1) was measured at 125° C. in accordance with ASTM D 1646-19a.

<Melting Point>

The melting point of the propylene polymers (B) was measured with a differential scanning calorimeter (DSC) in accordance with JIS K 7121. Specifically, pellets of the propylene polymer (B) were heated at 230° C. for 10 minutes, then cooled to 30° C. at a rate of 10° C./min, held at the temperature for 1 minute, and heated at a rate of 10° C./min. The temperature corresponding to the maximum amount of absorbed heat in the DSC curve was adopted as the melting point.

Example 1

140 Parts by mass of the copolymer (A-1) (100 parts by mass of the rubber component), 50 parts by mass of the propylene polymer (B-1), 15 parts by mass of the inorganic filler (C-1), 1 part by mass of the crosslinking agent (D-1), 1 part by mass of the crosslinking aid, and the softener were sufficiently mixed together in a Henschel mixer.

The numerical values (contents (parts by mass)) in the section of the softener in Table 1 are the total amounts of the softener contained in the copolymer (A-1) that was used, the softener used when the crosslinking agent (D-1) was mixed, and the softener used in the pellet preparation described below.

Subsequently, the mixture obtained in the Henschel mixer was injected into an extruder (model: KTX-46, manufactured by KOBE STEEL, LTD., cylinder temperatures: C1=110° C., C2=120° C., C3=140° C., C4=140° C., C5=150° C., C6=160° C., C7 to C8=180° C., and C9 to C14=230° C., die temperature: 200° C., screw rotational speed: 400 rpm, throughput: 50 kg/h). The mixture was dynamically crosslinked to give pellets of a thermoplastic elastomer composition.

Examples 2 to 11 and Comparative Examples 1 to 6

Pellets of thermoplastic elastomer compositions were obtained in the same manner as in Example 1, except that the types and the amounts of the raw materials were changed as described in Table 1. The numerical values in the sections of the raw materials in Table 1 indicate parts by mass.

<Melt Flow Rate (MFR)>

The melt flow rate of the thermoplastic elastomer compositions obtained in Examples and Comparative Examples was measured at 230° C. under 10 kg load or 5 kg load in accordance with JIS K 7210. The results are described in Table 1. The letter F indicates that the MFR was too low to be measured.

<Fabrication of Pressed Sheets>

The pellets of the thermoplastic elastomer composition obtained in Example or Comparative Example were pressed with a hot press machine (press temperature: 190° C., cooling temperature: 20° C., preheating time: 6 minutes, melting time under pressure: 4 minutes). By the pressing, each of the compositions was formed into a flat pressed sheet having a length of 12 cm, a width of 14.7 cm and a thickness of 2 mm.

<Fabrication of Injection Molded Articles>

The pellets of the thermoplastic elastomer composition obtained in Example or Comparative Example were injected with a 70-ton vertical injection molding machine under conditions where barrel temperature: 180° C. and injection speed: 50 mm/s. Cylindrical injection molded articles having a diameter of 29 mm and a length of 12.7 mm were thus obtained.

<Shore A Hardness>

A 6 mm thick sample was prepared by stacking three pieces of the 2 mm thick pressed sheet fabricated as described above, and was tested with a durometer in accordance with JIS K 6253 to determine the Shore A hardness (instantaneous value). The results are described in Table 1.

<Tensile Characteristics>

A dumbbell-shaped No. 3 test piece was prepared from the pressed sheet (thickness: 2 mm). The test piece was subjected to a tensile test in accordance with JIS K 6251 (stress rate: 200 mm/min, measurement temperature: 23° C.) to measure the modulus at 100% elongation (M100), the stress at break (TB) and the elongation at break (EB). The results are described in Table 1.

<Tear Strength>

A dumbbell-shaped No. 3 test piece was punched out from the 2 mm thick pressed sheet fabricated above, and was tested in accordance with JIS K 6252-1 (measurement temperature: 23° C.) to measure the tear strength. The results are described in Table 1.

<Compression Set (CS)>

In accordance with JIS K 6262, the cylindrical injection molded article was compressed by 25% in the longitudinal direction for 22 hours at 70° C. and was taken out from the compression device. Thirty minutes later, the length of the molded article was measured and the compression set was calculated. The results are described in Table 1.

<Evaluation of Airbag Deployability>

The airbag deployability was evaluated according to the evaluation criteria below based on the elongation at break and the tear strength. The airbag deployability was evaluated as good when the elongation at break and the tear strength were rated as A or B. The results are described in Table 1.

[Evaluation of Elongation at Break]

The elongation at break was evaluated based on the value of EB according to the following criteria.

A: The value of EB is 200% or more and less than 350%.

B: The value of EB is 350% or more and less than 450%.

C: The value of EB is 450% or more and less than 550%.

D: The value of EB is less than 200% or is 550% or more.

[Evaluation of Tear Strength]

The tear strength was evaluated based on the value of tear strength according to the following criteria.

A: Tear strength is 16 N/mm or more and less than 21 N/mm.

B: Tear strength is 21 N/mm or more and less than 27 N/mm.

C: Tear strength is 27 N/mm or more and less than 30 N/mm.

D: Tear strength is less than 16 N/mm or is 30 N/mm or more.

<Evaluation of Sheet-Forming Properties>

The sheet-forming properties were evaluated according to the criteria below based on the value of MFR of the thermoplastic elastomer composition measured under 230° C. and 10 kg load conditions.

A: MFR is 1 g/10 min or more and less than 50 g/10 min.

B: MFR is 50 g/10 min or more and less than 170 g/10 min.

C: MFR is 170 g/10 min or more and less than 220 g/10 min.

D: MFR is less than 1 g/10 min or is 220 g/10 min or more.

<Appearance Evaluation>

The pellets prepared were visually observed to visually determine the degree of color of the pellets.

A: The color of the pellets is milky white.

B: The color of the pellets is more yellowish than milky white.

C: The color of the pellets is fairly yellow.

D: The color of the pellets is strongly yellow.

TABLE 1

|  |  | Examples | | | | | |
|---|---|---|---|---|---|---|---|
|  |  | 1 | 2 | 3 | 4 | 5 | 6 |
| Raw materials | Copolymer (A-1) | 100 | 100 | 100 | 100 | 100 | 100 |
|  | Propylene polymer (B-1) MFR: 55 | 50 |  |  |  |  | 30 |
|  | Propylene polymer (B-2) MFR: 25 |  | 50 |  |  |  |  |
|  | Propylene polymer (B-3) MFR: 5 |  |  | 50 |  |  |  |
|  | Propylene polymer (B'-4) MFR: 0.5 |  |  |  |  |  |  |
|  | Propylene polymer (B-5) MFR: 50 |  |  |  | 50 |  |  |
|  | Propylene polymer (B-6) MFR: 45 |  |  |  |  | 45 |  |
|  | Inorganic filler (C-1): talc | 15 | 15 | 15 | 15 | 15 | 30 |
|  | Inorganic filler (C-2): calcium carbonate |  |  |  |  |  |  |

TABLE 1-continued

| | | | | | | | |
|---|---|---|---|---|---|---|---|
| | Crosslinking agent (D-1) | 1 | 1 | 1 | 1 | 1 | 1 |
| | Crosslinking aid | 1 | 1 | 1 | 1 | 1 | 1 |
| | Softener (total) | 71 | 71 | 71 | 71 | 71 | 71 |
| Evaluation results | MFR (g/10 min) 230° C., 10 kg load | 45 | 85 | 78 | 72 | 51 | 40 |
| | MFR (g/10 min) 230° C., 5 kg load | 0.7 | 2.4 | 2.1 | 1.8 | 0.9 | 0.5 |
| | Shore A hardness (instantaneous value) | 63 | 64 | 63 | 62 | 65 | 64 |
| | M100 (MPa) | 2.0 | 2.1 | 3.1 | 2.0 | 2.2 | 2.1 |
| | TB (MPa) | 3.6 | 4.0 | 4.5 | 4.1 | 4.0 | 4.3 |
| | EB (%) | 280 | 320 | 330 | 330 | 255 | 350 |
| | Tear strength (N/mm) | 20 | 22 | 20 | 19 | 23 | 19 |
| | CS (%) 70° C., 22 h | 22 | 22 | 21 | 23 | 23 | 22 |
| | Airbag evaluation deployability   EB | A | A | A | A | A | B |
| | Tear strength | A | B | A | A | B | A |
| | Sheet-forming properties evaluation | A | B | B | B | B | A |
| | Appearance evaluation | A | A | A | A | A | A |

(Continued)

| | | Examples | | | | |
|---|---|---|---|---|---|---|
| | | 7 | 8 | 9 | 10 | 11 |
| Raw materials | Copolymer (A-1) | 100 | 100 | 100 | 100 | 100 |
| | Propylene polymer (B-1) MFR: 55 | 50 | 50 | 50 | 50 | |
| | Propylene polymer (B-2) MFR: 25 | | | | | 50 |
| | Propylene polymer (B-3) MFR: 5 | | | | | |
| | Propylene polymer (B'-4) MFR: 0.5 | | | | | |
| | Propylene polymer (B-5) MFR: 50 | | | | | |
| | Propylene polymer (B-6) MFR: 45 | | | | | |
| | Inorganic filler (C-1): talc | 15 | 15 | 15 | 5 | |
| | Inorganic filler (C-2): calcium carbonate | | | | | 15 |
| | Crosslinking agent (D-1) | 1.2 | 1 | 1 | 1 | 1 |
| | Crosslinking aid | 1.2 | 1 | 1 | 1 | 1 |
| | Softener (total) | 71 | 67 | 63 | 71 | 71 |
| Evaluation results | MFR (g/10 min) 230° C., 10 kg load | 36 | 33 | 17 | 105 | 68 |
| | MFR (g/10 min) 230° C., 5 kg load | 0.3 | 0.2 | F | 4.2 | 1.6 |
| | Shore A hardness (instantaneous value) | 65 | 65 | 64 | 62 | 65 |
| | M100 (MPa) | 2.2 | 2.2 | 2.1 | 2.0 | 2.3 |
| | TB (MPa) | 4.0 | 4.9 | 4.7 | 4.5 | 4.4 |
| | EB (%) | 280 | 340 | 360 | 386 | 370 |
| | Tear strength (N/mm) | 20 | 23 | 22 | 20 | 24 |
| | CS (%) 70° C., 22 h | 19 | 22 | 24 | 23 | 25 |
| | Airbag evaluation deployability   EB | A | A | B | B | B |
| | Tear strength | A | B | B | A | B |
| | Sheet-forming properties evaluation | A | A | A | B | B |
| | Appearance evaluation | A | A | A | A | A |

(Concluded)

| | | Comparative Examples | | | | | |
|---|---|---|---|---|---|---|---|
| | | 1 | 2 | 3 | 4 | 5 | 6 |
| Raw materials | Copolymer (A-1) | 100 | 100 | 100 | 100 | 100 | 100 |
| | Propylene polymer (B-1) MFR: 55 | | | | | | |
| | Propylene polymer (B-2) MFR: 25 | 50 | | 50 | 50 | 70 | 35 |
| | Propylene polymer (B-3) MFR: 5 | | | | | | |
| | Propylene polymer (B'-4) MFR: 0.5 | | 45 | | | | |

TABLE 1-continued

| | | | | | | | |
|---|---|---|---|---|---|---|---|
| | Propylene polymer (B-5) MFR: 50 | | | | | | |
| | Propylene polymer (B-6) MFR: 45 | | | | | | |
| | Inorganic filler (C-1): talc | | 15 | | | | |
| | Inorganic filler (C-2): calcium carbonate | | | | | | |
| | Crosslinking agent (D-1) | 1 | 1 | 0.5 | 0.7 | 1 | 0.5 |
| | Crosslinking aid | 1 | 1 | 0.5 | 0.7 | 1 | 0.5 |
| | Softener (total) | 71 | 71 | 71 | 71 | 61 | 71 |
| Evaluation results | MFR (g/10 min) 230° C., 10 kg load | 246 | 21 | 27 | 34 | 60 | 0.5 |
| | MFR (g/10 min) 230° C., 5 kg load | 9.0 | F | F | 0.2 | 1.6 | F |
| | Shore A hardness (instantaneous value) | 64 | 65 | 62 | 64 | 73 | 53 |
| | M100 (MPa) | 2.1 | 2.2 | 2.0 | 2.1 | 2.3 | 1.3 |
| | TB (MPa) | 3.7 | 5.7 | 4.8 | 5.3 | 6.0 | 1.4 |
| | EB (%) | 310 | 470 | 450 | 480 | 560 | 158 |
| | Tear strength (N/mm) | 23 | 22 | 18 | 19 | 32 | 15 |
| | CS (%) 70° C., 22 h | 22 | 23 | 31 | 28 | 33 | 30 |
| | Airbag evaluation deployability — EB | A | C | C | C | D | D |
| | Airbag evaluation deployability — Tear strength | B | B | A | A | D | D |
| | Sheet-forming properties evaluation | D | A | A | A | B | D |
| | Appearance evaluation | A | A | A | A | A | D |

The invention claimed is:

1. A thermoplastic elastomer composition obtained by dynamically crosslinking:

100 parts by mass of an ethylene/α-olefin/non-conjugated polyene copolymer (A);

20 to 80 parts by mass of a propylene polymer (B) having a melt flow rate (measured at 230° C. under 2.16 kg load in accordance with ASTM D 1238-65T) of 1 to 100 g/10 min;

10 to 50 parts by mass of an inorganic filler (C); and a crosslinking agent (D), wherein the inorganic filler (C) consists of at least one selected from the group consisting of calcium carbonate, barium carbonate, magnesium carbonate, zinc carbonate, calcium sulfate, barium sulfate, magnesium sulfate, calcium phosphate, zinc oxide, iron oxide, calcium oxide, magnesium oxide, aluminum oxide, titanium oxide, barium oxide, calcium silicate, clays, kaolin, talc, silicas, diatomaceous earth, mica, asbestos, glass fibers, glass beads, Shirasu balloons, silicic acid clay, zeolites, tungsten sulfide, molybdenum sulfide, graphite and carbon black, wherein the crosslinking agent (D) is an organic peroxide, and wherein an elongation at break is 200% or more and less than 450% (as measured in accordance with JIS K 6251 with respect to a 2 mm thick sheet of the thermoplastic elastomer composition).

2. The thermoplastic elastomer composition according to claim 1, which satisfies the following (1) and (2):

(1) a Shore A hardness (instantaneous value) is 40 to 80 (as measured in accordance with JIS K 6253 with respect to a 6 mm thick sample including a laminate of three 2 mm thick sheets of the thermoplastic elastomer composition); and (2) a tear strength is 16 N/mm or more and less than 27 N/mm (as measured in accordance with JIS K 6252-1 with respect to a 2 mm thick sheet of the thermoplastic elastomer composition).

3. The thermoplastic elastomer composition according to claim 1, wherein the content of the crosslinking agent (D) is 0.5 to 5.0 parts by mass with respect to 100 parts by mass of the copolymer (A).

4. The thermoplastic elastomer composition according to claim 1, which comprises an at least partially crosslinked ethylene/α-olefin/non-conjugated polyene copolymer.

5. The thermoplastic elastomer composition according to claim 1, wherein the inorganic filler (C) is talc or calcium carbonate.

6. A shaped article comprising the thermoplastic elastomer composition according to claim 2.

7. A vehicle part comprising the shaped article according to claim 6.

8. The vehicle part according to claim 7, which is an interior skin material.

9. The vehicle part according to claim 7, which is an instrumental panel.

* * * * *